Oct. 7, 1969    F. ROBERTS, JR    3,471,287
PROCESS OF MAKING MULTIPOROUS FUEL CELL ELECTRODES
Filed June 29, 1966

INVENTOR,
FRANK ROBERTS, JR.

United States Patent Office 3,471,287
Patented Oct. 7, 1969

3,471,287
PROCESS OF MAKING MULTIPOROUS
FUEL CELL ELECTRODES
Frank Roberts, Jr., Manchester, Conn., assignor, by mesne assignments, to Leesona Corporation, Warwick, R.I., a corporation of Massachusetts
Filed June 29, 1966, Ser. No. 561,553
Int. Cl. B22f 7/02, 3/10; C22g 1/08
U.S. Cl. 75—208                                    8 Claims

ABSTRACT OF THE DISCLOSURE

The method of making porous fuel cell electrodes from powdered metal is improved by forming the fine pore structure in more than one layer and then bonding these layers into a unitary structure. In the event that flaws or enlarged pores are inadvertently created in any of these layers in the forming process, there is very little likelihood that these will be in communication with each other and thus adversely affect the operation of the electrode or the fuel cell.

---

Figure 1:
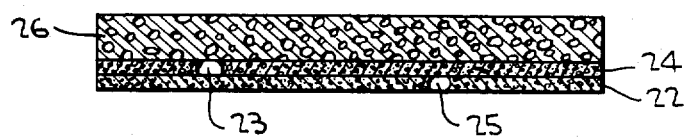

This invention relates to improved bi-porous electrodes such as may be used in electrochemical cells such as fuel cells, and to fuel cells employing such electrodes. More particularly, this invention relates to such electrodes which have been fabricated so as to minimize the probability of the occurrence of oversize pores or local flaws which could permit the passing of fuel (in the case of the anode) or oxidant (in the case of the cathode) into the electrolyte compartment or, conversely, the flooding of the electrode. This invention also relates to an improved method of making such electrodes.

The term "fuel cell" as used herein embraces an electrochemical cell in which the free energy of the cell is converted directly into electrical energy. Although there are many types of fuel cells and many systems for classifying them, the structure of one class of such cells contains a pair of bi-porous electrodes separated by an electrolyte, the electrodes being electrically connected to each other through an external resistance.

The structure of the fuel cell electrodes must be such as to permit the establishment of an interface within the electrically conducting structure, at which interface the gaseous or liquid fuel (in the case of the anode) or the oxidant (in the case of the cathode) may react with the ionic electrolyte. In the type of fuel cell electrode here under consideration, this interface is created between the coarse porosity layer and the fine porosity layer of the dual porosity micro-porous structure. In these bi-porous electrodes the larger pores face the fuel or oxidizer and the small pores face the electrolyte. The size of the pores of the fine pore layer is sufficiently small to prevent the gaseous reactant (fuel or oxidant) from passing therethrough at the fuel cell operating pressure when the electrode is immersed in electrolyte. The pore size in the coarse pore layer, on the other hand, is such as to permit passage of the reactants (fuel or oxidant) so that the electrode structure in its entirety provides for the confluence of gaseous fuel or oxidant with liquid electrolyte within the electrochemically active zone of the electrode. A method for making such bi-porous electrodes is disclosed in copending patent application Ser. No. 429,204 of Houghtby et al., filed Jan. 21, 1965, now Patent No. 3,364,019.

However despite the fact that these bi-porous electrodes are made with great care, occasional flaws or oversize pores are found to occur in the fine pore layer of the electrode when manufactured, or to develop therein during service. Such oversize pores make it possible for the gaseous reactant to pass through unreacted to the electrolyte compartment, whereby causing serious deterioration of performance or even premature failure of the fuel cell. An explosion hazard is also created when this occurs.

It is an object of this invention to provide a bi-porous electrode wherein the probability of the occurrence of flaws or oversize pores in the fine porous layer such as would permit the passage of gaseous reactants is substantially reduced or virtually eliminated.

It is another object of this invention to provide a method for making such electrodes which can be relied upon not to suffer from such defects, and thereby to provide a more economical method of constructing fuel cells of a high level of reliability.

Figure 2:
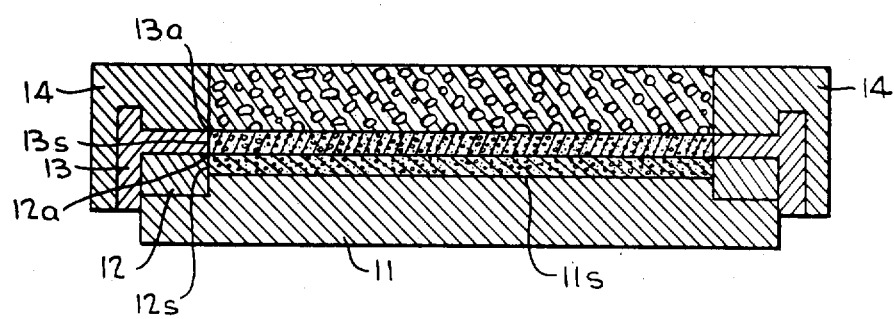

The accomplishment of these and other objects of this invention will become more apparent from the following detailed description when considered in conjunction with the attached drawings, in which:

FIGURE 1 is a cross-sectional view of one embodiment of an electrode made by the process of this invention; and FIGURE 2 is a cross-sectional view of an electrode being made according to one embodiment of this invention.

I have now found that when the fine pore layer of one of these bi-porous electrodes is itself fabricated in a plurality of steps, each step of the fabrication process involving preparing only a portion of the total desired thickness of the fine pore layer, the probability of producing an electrode with an oversize pore or flaw which permits passage through to the electrolyte of fuel or oxidant or, contrariwise, flooding is reduced virtually to zero. For practical purposes such electrodes can be produced with a sufficiently high degree of reliability by manufacturing the fine pore layer in two steps.

The said co-pending patent application of Houghtby et al. discloses a general method for preparing bi-porous electrodes which has applicability to the instant invention. That method generally involves sifting a carefully and sharply graded powder of the metal (such as nickel) from which the electrode is to be prepared into a lateral retaining device which has a height equal to the thickness desired for the fine pore layer of the electrode. This layer of metal powder is then compacted by vibration or by application of compressive force. Then another retaining device having a height equal to the thickness desired of the coarse pore layer of the electrode is superimposed upon the first retaining device and additional powdered metal, this time sharply and carefully graded to contain coarser particles, is sifted into the second lateral retaining device until it has been filled. This layer of powder is also compacted and then the entire assembly is sintered to fuse the metal powder at the points of contact and provide the desired bi-porous electrode.

Following are a number of relvant observations made about such fuel cell electrodes in the said co-pending application of Houghtby et al.:

(1) The pore size of the plate is linearly dependent upon the mean particle size for spherical particles if vibratory compaction is used, with the following relationship being obtained if the sintering is carried out at a temperature of 1830° F. for 45 minutes in an atmosphere of 90 percent argon and 10 percent hydrogen:

$$P = 0.282D + 1.70$$

where P=mean pore size (microns), and D=mean particle diameter (microns).

(2) Pore size distribution is dependent upon particle size distribution; a narrow particle size distribution resulting in a corresponding narrow pore size distribution. However, a large decrease in particle size must be obtained for a small reduction of pore size range.

(3) Total porosity is independent of spherical particle size in vibratory compaction, achieving a value of 44 percent except for small particles which do not achieve optimum packing.

(4) Ultimate tensile strength and ductility are dependent upon mean particle size and sintering temperature with higher strength and ductility being obtained for increasingly smaller particle sizes at higher temperatures.

(5) Electrodes constructed of spherical nickel particles can be successfully sintered in pure hydrogen without excessive shrinkage; however, those composed partially or totally of carbonyl powders must be sintered in an atmosphere with a low hydrogen content (10 percent).

(6) A greater degree of reproducibility and a narrower pore size range is obtained by use of spherical rather than carbonyl nickel powders.

Metallic and carbon powders can be conveniently used in fabricating the described electrodes. However, spherical nickel powders have been found to be particularly desirable inasmuch as they permit convenient separation into size portions, allowing a mathematical analysis of porosity and pore size. For a group of single sized particles, various types of packing are possible. If two different particle size powders are mixed, porosity decreases in a manner depending upon the ratio of particle diameters. A single size, or sharply graded powder is, therefore, preferred for maximum porosity and controlled pore size.

There are many graded powders available commercially for use in the manufacture of the instant electrodes. Table I sets forth a number of nickel powders and pertinent data thereof including shape, mean particle size, particle size range, and specific gravity which are particularly suitable in this invention. While this table is limited to nickel powders, it is, of course, possible to employ other metallic powders such as metals found in Group VIII and I–B in the Periodic Table, such as silver, gold, ruthenium, rhodium, palladium, osmium, iridium, or platinum, as well as carbon. These materials are available commercially and their proper selection is within the ability of one skilled in the art.

TABLE I.—SHAPE AND SIZE DISTRIBUTION OF GRADED NICKEL POWDERS

| Reference Code | Shape | Mean Particle Size (Microns) | Particle Size Range (Microns) | Specific Gravity |
| --- | --- | --- | --- | --- |
| 6±3 | Spherical | 6 | [1] 4–9.8 | 8.851 |
| 12±6 | do | 12 | [1] 6–17 | 8.801 |
| 24±9 | do | 13 | [2] 4–21 | 9.23 |
| 21±10 | do | 21 | [1] 12–32 | 8.863 |
| 22±7 | do | 22 | [1] 15.5–28 | 8.412 |
| 27±15 | do | 24 | [1] 7–47 | |
| 27±10 | do | 27 | [1] 18.5–33 | 9.095 |
| 30±14 | do | 30 | [1] 21.5–41 | 8.905 |
| 37±12 | do | 37 | [1] 25–49 | 8.912 |
| 42±9 | do | 42 | [1] 30–54 | 8.632 |
| 66±6 | do | 66 | [2] 60–72 | 8.8143 |
| 87±12 | do | 87 | [2] 75–98 | 6.2976 |

[1] Powder size distribution is determined by a free settling air column method. In this procedure, a quantity of the powder is permitted to fall by gravity into a tube in which there is an upward flow of gas of free circulating velocity. The coarser, heavier particles fall more rapidly to the bottom thereby permitting particle separation.
[2] Powder distribution is determined by optical count. Actual optical count corresponds to free settling air column for mean particle size but gives a broader particle size distribution.

The methods of compaction used in the manufacture of the instant electrodes include the use of both pressure and vibratory techniques. In employing the pressure method, it is possible to vary the pressure over a relatively wide range. For example, nickel powders were pressed at pressures as low as 800 p.s.i. and as high as 8,000 p.s.i. If other metals are employed, the conditions can be varied to suit the particular properties of the metals. However, preferably the pressures employed will range from about 500 p.s.i. to about 8,000 p.s.i., depending upon the powder selected, as well as sintering temperatures. The experimental work conducted indicates that the mean pore size, pore size range, total porosity, and linear shrinkage are all decreased as both the mean particle size and compacting pressure are increased. The open porosity is decreased as the mean particle size is increased and is relatively unaffected by pressure. The mean pore size and total porosity apparently are a function of compacting pressure whereas the open porosity is a function of mean particle size. Thus, a manufacturing technique employing pressure compaction of spherical powders will control both pore size and open porosity and allow the use of less closely graded powders. However, porosities obtained by pressure compaction are consistently lower than those obtained by vibratory compaction. Data obtained using pressure compaction are set forth in Table II.

TABLE II.—PROPERTIES OF PRESSURE COMPACTED SAMPLES MADE WITH VARIOUS SIZE SPHERICAL NICKEL POWDERS

| Powder Size (Microns) | Pressure (p.s.i.) | Shrinkage (percent) | Mean Pore Size (Microns) | Pore Size Range (Microns) | Total Porosity (percent) | Open Porosity (percent) |
| --- | --- | --- | --- | --- | --- | --- |
| 21±10 | 1,000 | 1.57 | 5.8 | 3.0–7.6 | 40.3 | 35.2 |
| | 3,000 | 1.38 | 5.7 | 2.2–7.0 | 40.3 | 32.5 |
| | 5,000 | 1.18 | 5.5 | 2.7–7.0 | 40.6 | 29.0 |
| 24±9 | 1,000 | 0.39 | 8.5 | 3.2–12.0 | 41.1 | 27.8 |
| | 3,000 | 0 | 7.3 | 3.2–12.0 | 41.8 | 36.2 |
| | 5,000 | 0.20 | 7.5 | 3.4–12.0 | 41.1 | 30.8 |
| 27±15 | 1,000 | 0.98 | 6.4 | 2.6–12.0 | 41.7 | 13.5 |
| | 3,000 | 0.98 | 5.9 | 2.5–10.0 | 38.3 | 23.8 |
| | 5,000 | 0.79 | 5.5 | 2.2–8.0 | 38.5 | 14.4 |

Sinter condition: 15 min. at 1,830° F. in .90A–.10H atmosphere.

In employing the vibratory compaction process, the metal powders are placed in a suitable container such as an alumina-coated metal dish approximately 3 inches in diameter and ⅛ of an inch deep and vibrated. The discs obtained are then sintered. It is possible to use any of the vibrators available in the art, as for example, the Syntron vibrator which produces lateral motion or a vibrating table which produces vertical motion. It is possible to vary the amplitude, time of vibration and powder particle size in order to obtain electrodes suitable for a particular end use. For example, eight size ranges of graded nickel powders were laterally vibrated on a Syntron vibrator at an amplitude of 0.008 inch for three minutes and sintered at 1830° F. for 45 minutes in a 90 percent argon and 10 percent hydrogen atmosphere. Data obtained from these tests are listed in Table III.

TABLE III.—PROPERTIES OF VIBRATORY COMPACTED SAMPLES MADE WITH VARIOUS SIZE NICKEL POWDERS

| Powder Size (Microns) | Mean Pore Size (Microns) | Pore Size Range (Microns) | Total Porosity (percent) | Open Porosity (percent) |
| --- | --- | --- | --- | --- |
| 6±3 | 2.9 | 1.2–5.0 | 54.2 | 38.8 |
| 22±7 | 7.2 | 3.5–10.0 | 46.1 | 36.2 |
| 27±10 | 8.5 | 4.0–11.0 | 48.2 | 37.7 |
| 30±14 | 10.5 | 5.0–17.0 | 43.5 | 35.4 |
| 37±12 | 14.0 | 5.9–19.0 | 43.7 | 32.3 |
| 45±13 | 14.0 | 7.8–17.0 | 43.4 | 34.0 |
| 66±6 | 22.0 | 11.0–27.0 | 43.6 | 28.3 |
| 87±12 | 27.0 | 17.0–33.0 | 44.5 | 27.4 |

Vibratory condition: Lateral vibration at an amplitude of 0.008 inch for 3 minutes.
Sinter conditions: 45 minutes at 1,830° F. in a .90A–.10H atmosphere.

It is apparent from the data that the sintered mean pore size increases linearly as a function of mean spherical nickel particle size and can be computed from the following relationship when sintered at 1830° F. for 45 minutes in a 90 percent argon and 10 percent hydrogen atmosphere:

$$P = 0.282D + 1.70$$

where P=mean pore size (microns), and D=mean particle diameter (microns).

The results are reproducible with very little scatter in mean pore size. Observed pore size values are decreased less than 10 percent when the sintering temperature is increased to 2100° F., the effect of temperature being discussed hereinafter.

Total porosity using nickel particles, decreases to a minimum of 44 percent as the mean particle size increases and is constant at this value beyond an apparently critical particle size at 30 microns. The higher porosities obtained for smaller particle diameters may be due to an inability to approach ideal "packing." Thus, the pore size range is dependent on particle size range; however, it is noted that a large reduction of particle size range is required to obtain a small reduction in sintered pore size range.

Variation of vibratory amplitudes causes the mean pore size and open porosity to be altered; the pore size range narrows slightly and total porosity remains nearly constant as the amplitude is increased. Further, it has been found that if the time of vibration is varied, the mean pore size and total and open porosities decreases slightly as the time of vibration is increased. The limits of the pore size range are decreased as the vibrating time is increased, but the pore size range is not narrowed appreciably with longer vibratory times.

The sintering of the instant electrodes after compaction can be carried out in any of the usual sintering furnaces, for example, a retort incline furnace. It is possible and often desirable to sinter the samples according to a predetermined cycle. For example, the cycle may consist of preheating to 800° F. for 20 minutes, sinter at a temperature of from 1200 to 2400° F. for from about 10 to 80 minutes. cooling at 800° F. and 400° F. for 20 minutes each. It is found that as the sintering temperature is varied, the open porosity decreases and linear shrinkage increases with increased sintering temperatures. Total porosity, mean pore size range, and pore size range are decreased less significantly by an increased sintering temperature. Several dual porosity electrodes were made with graded Federal Mogul powders. They were vertically vibrated at three minutes at an amplitude of 0.004 inch. Electrodes were then sintered at 2100° F. and their properties compared to electrodes made with the same powders and by the same method but sintered at 1830° F. The data are listed in Table IV and indicate that the mean pore size, pore size range and total porosity are all slightly decreased by the increased sintering temperature.

Open porosity is not significantly changed by this increased sintering temperature. Further, it has been found that the open porosity decreases and linear shrinkage increases directly with longer sintering times. Mean pore size, pore size range and total porosity are decreased slightly with longer sintering times, but they are decreased more appreciably by greater compacting pressures.

Variation in the sintering atmosphere also has a substantial effect upon the pore size, linear shrinkage, etc. For example, if the sintering takes place at an atmosphere of hydrogen as opposed to sintering in a 90 percent argon and a 10 percent hydrogen atmosphere linear shrinkage is decreased. It was noted, further, that linear shrinkage of carbonyl nickel powders increases with increasing hydrogen content in the sintering atmosphere. This indicates electrodes composed solely of graded spherical powders can be successively sintered in pure hydrogen without excessive shrinkage.

Thus, as is apparent, through proper control of compacting techniques, sintering techniques, and by the judicious selection of the metal or carbon particles, electrodes having controlled and reproducible pore size, and porosity are formed.

One method of preparing an electrode of the instant invention will now be described by reference to FIGURE 2.

A circular retaining ring 12 with a lip which may conveniently have a thickness of from 0.003 to 0.30 inch is placed on top of bottom die 11, the top surface 11s of which is coated with a coating which serves to prevent adhesion of particles thereto. Alumina coatings serve admirably for this purpose. A volume bounded by the inside surface 12s of the circular ring and existing above the top surface 11s of the bottom die and below the upper edge 12a of the ring 12 is thus defined. To perform the first step in the process of preparing the fine pore layer, a metal powder of select fine particle size is carefully sifted into this volume until it is slightly overfilled and the excess is struck off at the level of the upper edge 12a of circular ring 12. In the embodiment described, the powder used is designated as Nickel D powder by the manufacturer, International Nickel Company. It has a particle side range of 3 to 10 microns, with a mean particle size of 8 microns. The powder is deposited to a depth of 0.10 inch over the top surface of the ring 12. This layer of nickel powder is then compacted either by a vibratory or by pressure technique and subsequently sintered as described hereinabove. After this assembly has cooled, retaining ring 13 is superimposed upon ring 12 and the remainder of the fine pore layer of the electrode is formed. More powder of the kind utilized in the first step is sifted similarly to overfill the volume defined by the top surface of the material sintered in the first step, and the inside surface 13s and upper lip 13a of retaining ring 13. The excess powder is again struck off at the level of the top surface of retaining ring 13, forming, in this example, another thickness of powdered metal. The newly deposited powder is compacted in a manner identical to that used in the first step. Unless this newly formed layer is to consitute the last layer of fine pore sintered metal, it is sintered in a manner identical to that used in the first step.

This process is repeated with each step in the process of preparing the fine pore layer of the electrode except for the last step.

In the last step of preparing the fine pore layer, the desired volume of powdered metal is again deposited, struck off and compacted. However, the sintering step TABLE IV.—PROPERTIES OF DUAL POROSITY ELECTRODES MADE WITH NICKEL POWDERS SINTERED AT 1,830 and 2,100° F.

| Powder Size (Microns) | Mean Pore Size (Microns) | | Pore Size Range (Microns) | | Total Porosity (Percent) | | Open Porosity (Percent) | |
|---|---|---|---|---|---|---|---|---|
| | 1,830° F. | 2,100° F. | 1,830° F. | 2,100° F. | 1,830° F. | 2,100° F. | 1,830° F. | 2,100° F. |
| 6±3 | 2.5 | 2.6 | 1.8–3.5 | 1.8–4.0 | 49.7 | 42.7 | | |
| 27±10 | 11.0 | 9.0 | 8.0–18.0 | 5.5–16 | 51.6 | 46.9 | | |
| 66±6 | 20 | 18 | 15–29 | 12–23 | 44.0 | 42.0 | 30.0 | 27.8 |
| 87±12 | 29 | 27 | 17–48 | 13–35 | 50.7 | 44.8 | 27.1 | 27.9 |

Vibratory conditions: Vertical vibration for 3 min. at an amplitude of 0.004″.
Constant sinter conditions: 45 min. at temperature in a .90A-.10H atmosphere.

is omitted. Instead upper retaining ring 14 is superimposed on the retaining ring used to form the last fine-pore layer and metal powder having a larger average particle size as for example a powder having a particle size distribution of from 15 to 100 microns, is deposited in the volume thus defined. Thereafter, the powder is struck off, compacted and the assembly sintered. Upon removal from the mold, the finished electrode shown in FIGURE 1 is obtained.

According to another embodiment of this invention, the bi-porous structures are made in larger "sheets" and then "coined" to size. Thus, the same 8 micron mean particle size Nickel D powder as used in the technique described above is sifted into a conveniently sized mold, as for instance one which is 9 inches by 9 inches by 10 mils deep. The powder is struck off at the upper lip of the mold and, without prior compaction, is sintered in the mold. The sinter is rolled between cylindrical compaction rollers to reduce the thickness by about 50 percent. This will produce a porous metal sinter 5 mils thick which is about 35 percent porous with a mean pore size of approximately 3.5 microns. A second sinter is made in the same fashion. These two sinters are joined by cleaning their faces, loading one on top of the other and re-sintering to bond one to the other. This 10 mils thick laminated fine pore metal is placed in the bottom of a mold which is then filled to the desired thickness with the larger particle size metal powder. This powder is struck off, the assembly is again sintered and compacted by rolling to produce the desired porosity in the coarse pore layer. Electrodes of the desired dimension are then "coined," i.e. stamped, from this laminated structure.

Although the instant invention requires a number of processing steps, it actually presents a very economical way of making bi-porous electrodes. As has been explained, when bi-porous electrodes are made by prior art procedures, a certain proportion of them have to be scrapped because of the presence of oversize pores in the fine pore layer. What is worse, some such electrodes will be found to have oversize pores which do not extend all the way through the fine pore layer when manufactured, but which wear, erode or corrode during service to the point where they do permit passage of reactant into the electrolyte. This type of failure, aside from creating an explosion hazard, requires that an operating cell be shut down for electrode replacement. Another economy achieved by the use of the instant invention stems from the fact that cheaper materials in the form of less carefully graded metal powders may be used.

FIGURE 1 shows a laminated fine-pore construction biporous electrode of the instant invention. Fine-pore layer 22 contains an oversize pore or flaw which penetrates the entire thickness of that layer at 25. Fine-pore layer 24 also has such an oversize pore or flaw at 23. Although it may happen that each of the fine pore layers contains an oversize pore which penetrates that entire layer, one will virtually never find that such pores are so located as to be in communication with each other and thereby permit the passage of reactant through the entire fine pore portion of the electrode. For all practical applications, including for fuel cells to be used in space vehicles, it suffices to make the fine pore portion of the electrode in two layers.

Variations which are within the scope of the instant invention will be apparent to those skilled in this art. One such variation would be to use powders of different particle size in forming each of layers 22, 24 and 26.

I claim:

1. In the process of making bi-porous electrodes having layers of different and controlled pore size and porosity and of a given thickness employing metal powders of a select particle size, the improvement characterized in that a plurality of layers of substantially equal pore size and porosity are separately sintered from select metal particles, each of said plurality of layers having a thickness less than the thickness of the total electrode, sintering said plurality of layers together to provide a first composite structure of controlled pore size and porosity and of a given thickness, and thereafter separately sintering a second structure having a controlled pore size, porosity, and thickness and then sintering said second structure to said first composite structure, said second structure having a controlled pore size greater than the pore size of said first composite structure.

2. In the process of making bi-porous electrodes having layers of different and controlled pore size and porosity and of a given thickness employing metal powders of a select particle size, the improvement characterized in that a plurality of layers of substantially equal pore size and porosity are separately sintered from select metal particles, each of said plurality of layers having a thickness less than the thickness of the total electrode, sintering said plurality of layers together to provide a first composite structure of controlled pore size and porosity and of a given thickness, and thereafter sintering an additional layer upon said composite structure employing metal powders of a select particle size to obtain a layer having a controlled thickness, a controlled porosity and a controlled pore size which is greater than the controlled pore size of the first formed composite structure.

3. The process for making an improved multi-porosity electrode comprising fabricating a layer of a predetermined thickness of powdered metal of a fine particle size range, sintering the same to form a porous metal layer, fabricating another layer of predetermined thickness of said powdered metal of fine particle size range upon said porous metal layer, and then fabricating thereover a layer of predetermined thickness of a powdered metal of an average particle size larger than that of the previous layers, and sintering the assembly thus formed.

4. The process of claim 3 wherein said powdered metal is nickel.

5. The process of claim 3 wherein said first layer is of particles having a mean particle size in the range of 8 microns.

6. In the process for making a dual porosity electrode by sequentially forming two layers, each from powdered metal of a particle size range different from that of the other, by depositing a first predetermined thickness of a metal powder of a first particle size range in a lateral retaining means therefor, compacting the same, and subsequently depositing thereover a second predetermined thickness of a metal powder of the other predetermined particle size range in a lateral retaining means therefor, compacting the same, and sintering the resultant assembly, the improvement in the step of forming the layer from the finer of said particle size ranges comprising first depositing only a fraction of said predetermined thickness of said metal powder, compacting the same and sintering the same, and subsequently depositing the remainder of said thickness of said metal powder, whereby the layer formed from said finer particle size metal is formed in more than one separate step and the probability of an oversize pore penetrating the entire thickness of said layer is greatly reduced.

7. The process of claim 6 wherein said powdered metal is nickel.

8. The process of claim 6 wherein the metal powder in the layer of the finer of said particle size ranges has a mean particle size on the order of eight microns.

References Cited

UNITED STATES PATENTS

| 2,251,410 | 8/1941 | Koehring | 75—208 X |
| 2,267,918 | 12/1941 | Hildabolt | 75—208 X |
| 2,464,517 | 3/1949 | Kurtz | 75—208 |

(Other references on following page)

UNITED STATES PATENTS

| | | | |
|---|---|---|---|
| 2,703,750 | 3/1955 | Cotter | 75—208 X |
| 3,010,196 | 11/1961 | Smith | 75—208 X |
| 3,311,507 | 3/1967 | Dittmann | 29—182.2 |

FOREIGN PATENTS

| | | |
|---|---|---|
| 688,497 | 6/1964 | Canada. |
| 369,964 | 3/1932 | Great Britain. |
| 544,969 | 5/1942 | Great Britain. |

CARL D. QUARFORTH, Primary Examiner

A. J. STEINER, Assistant Examiner

U.S. Cl. X.R.

75—214, 222